Aug. 9, 1960
W. F. SPANG
2,948,016
STRIP SEVERING MECHANISM
Filed July 2, 1957
2 Sheets-Sheet 1
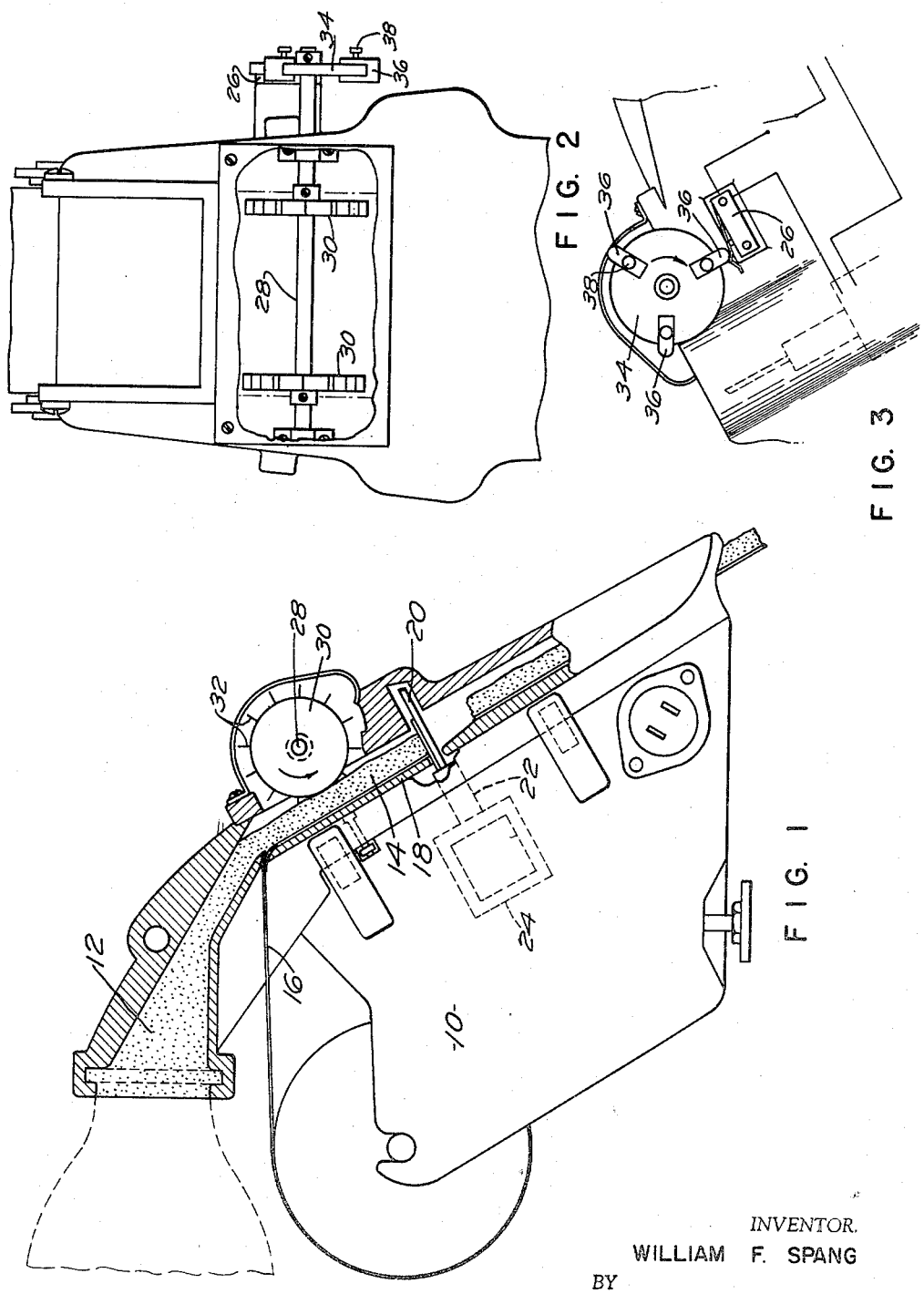
INVENTOR.
WILLIAM F. SPANG
BY
Kenway, Jenney, Witter & Hildreth
ATTORNEYS

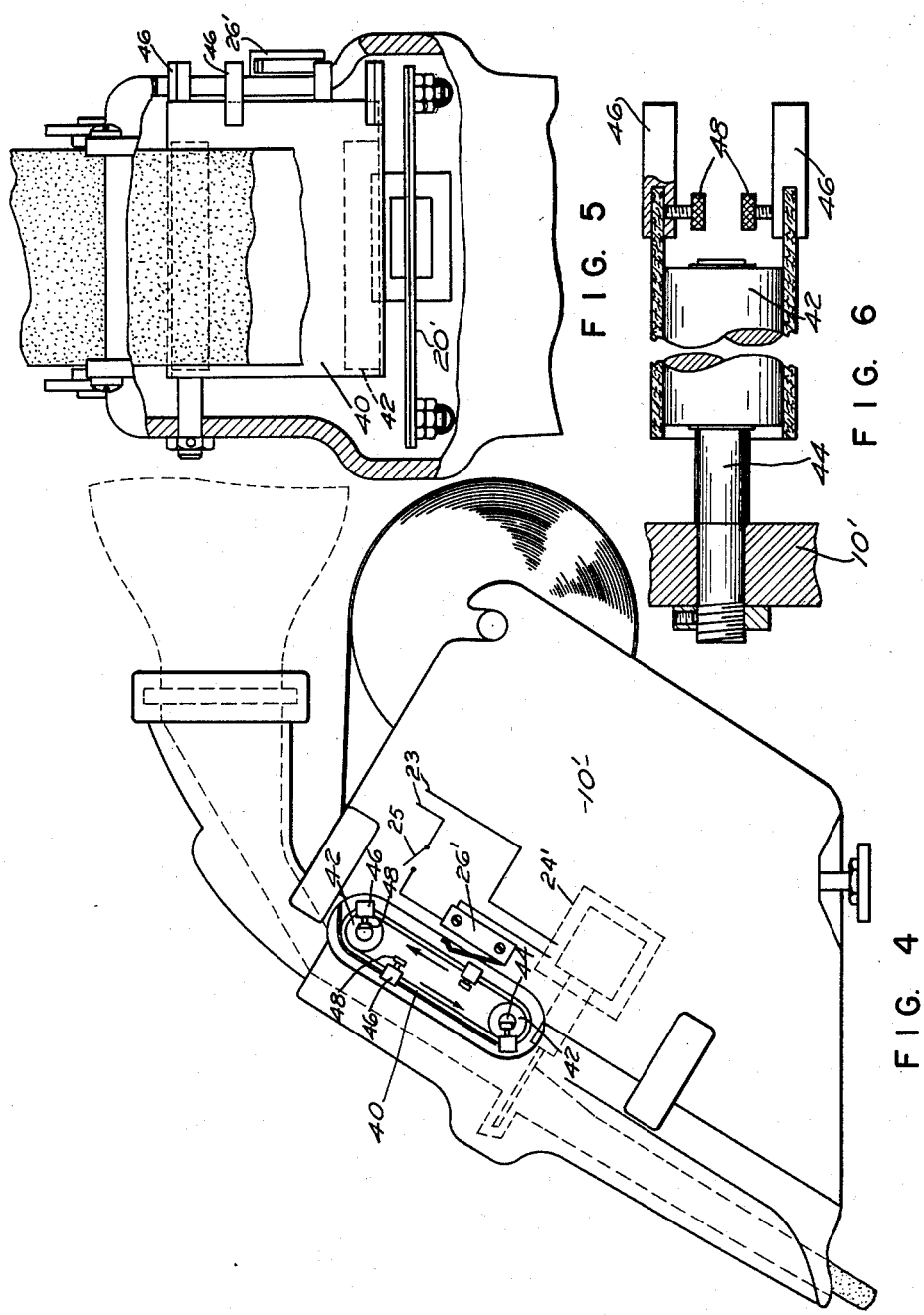

United States Patent Office 2,948,016
Patented Aug. 9, 1960

2,948,016

STRIP SEVERING MECHANISM

William F. Spang, Medfield, Mass., assignor to Needham Manufacturing Company Inc., Needham, Mass., a corporation of Massachusetts Filed July 2, 1957, Ser. No. 669,531

2 Claims. (Cl. 17—32)

This invention relates to strip severing mechanism and more specifically to a hamburg patty making machine of the nature shown in Patent 2,795,816 dated June 18, 1957. This patent shows and describes mechanism for extruding ground meat into a ribbon-like strip and automatically cutting hamburg patties of predetermined size from the end thereof. The cutting means comprises a severing knife under the control of a tripping switch. The present invention embodies other and relatively simple mechanism for automatically performing the tripping switch operation and the primary object of the invention resides in the production of novel mechanism including switch tripping elements disposed to move past the switch in a predetermined path and synchronously with the movement of the strip and thus causing the knife to cut uniform patties of predetermined length from the end of the strip.

These and other features of the invention will be best understood and appreciated from the following detailed description of preferred embodiments thereof, selected for purposes of illustration and shown in the accompanying drawings, in which:

Fig. 1 is a side elevation partially in section of a machine embodying the invention, Fig. 2 is a fragmentary plan view partly broken away, Fig. 3 is a fragmentary side elevation, Fig. 4 is a side elevation of a modified construction, Fig. 5 is a fragmentary plan view thereof, and Fig. 6 is a fragmentary enlarged sectional view illustrating a detail.

Referring first to Figs. 1–3 of the drawings, 10 indicates a housing adapted to be attached to the delivery end of a meat grinding machine, and disposed to receive the ground meat 12 therefrom and extrude it into a ribbon-like strip 14. The strip passes onto a continuous paper sheet 16 and continues therewith downwardly on a guideway 18. A guillotine knife 20, shown more fully in said patent, is disposed transversely across and above the guideway and is connected to the core 22 of a solenoid 24. When the solenoid is energized the knife is drawn forwardly-downwardly and severs a patty from the end portion of the strip. The patty thereupon slides down the guideway by gravity.

The solenoid is under the control of a normally open microswitch 26 in circuit with the solenoid, as shown in Figs. 1, 2 and 4, and closing of the switch effects energizing of the solenoid. The electric circuit as specifically illustrated in Fig. 4 comprises lead-in wires 23 extending through a hand switch 25, a microswitch 26' and a solenoid 24'. A shaft 28 mounted for free rotation in the housing and extending transversely across and above the strip 14 is provided with one or more annular elements 30 fixed thereto and having outwardly projecting blades 32 at its periphery disposed to penetrate slightly into the strip and rotate the shaft as the strip moves forwardly. Mounted on an end of the shaft is a disk 34 having one or more tripping elements 36 disposed to contact and close the switch 26 when the shaft is rotated. Three such elements are illustrated in Figure 3 and each is secured to the disk by a clamping screw 38, the elements being thereby adjustable to predetermined spacing on and about the disk.

As the strip moves forwardly the disk 34 is rotated synchronously therewith and the knife is operated to sever a patty whenever an element 36 engages and closes the switch, thus automatically severing the strip into patties of a length corresponding to the spacing of the elements 36.

In Figs. 4–6 I have illustrated the housing 10' as provided with an endless conveyor 40 for receiving and carrying the extruded strip on its top reach, each loop end of the conveyor being supported on a roller 42 carried on a shaft 44 in the housing. Disposed on and along a margin of the conveyor are a plurality of switch tripping elements 46 similar to the elements 36. Each element is secured to the conveyor by a clamping screw 48 and can be adjusted along the conveyor as will be apparent. The elements are disposed to contact and close the switch 26' and thereby function automatically to sever the strip into patties of predetermined length.

Having thus disclosed my invention what I claim as new and desire to secure by Letters Patent is:

1. A machine for severing into uniform lengths a strip of material moving longitudinally along a predetermined path, comprising a knife disposed transversely of said path, power-operated mechanism including an electric circuit for moving the knife forwardly in cutting direction to sever the strip, an electric switch in said circuit, means including a plurality of uniformly spaced tripping elements mounted for movement in an endless predetermined path past said switch, and means adapted to cooperate with the strip to move the elements continuously along said path synchronously with the movement of the strip and trip the switch and cause the power-operated mechanism to operate the knife and sever the strip as each element passes the switch.

2. The machine defined in claim 1 in which said means includes an endless conveyor supporting and moving with the strip and supporting said tripping elements in spaced relation thereon and therealong.

References Cited in the file of this patent

UNITED STATES PATENTS

| | | |
|---|---|---|
| 731,656 | Barnes | June 23, 1903 |
| 1,745,985 | Denmire | Feb. 4, 1930 |
| 2,171,667 | Mickelson et al. | Sept. 5, 1939 |
| 2,403,147 | Westergaard | July 2, 1946 |
| 2,519,221 | Bogen et al. | Aug. 15, 1950 |
| 2,617,593 | Audier et al. | Nov. 11, 1952 |
| 2,795,816 | Spang et al. | June 18, 1957 |
| 2,810,155 | Spang | Oct. 22, 1957 |